United States Patent [19]

Phillippe

[11] 3,768,582

[45] Oct. 30, 1973

[54] STABILIZING DEVICE
[75] Inventor: Maurice Phillippe, Hethersett, England
[73] Assignee: Vel's Ford Sales Co., Inc., Torrance, Calif.
[22] Filed: Feb. 14, 1972
[21] Appl. No.: 226,128

[52] U.S. Cl. ............................ 180/1 FV, 296/1 S
[51] Int. Cl. ............................................. B62d 37/02
[58] Field of Search .................. 180/1 FV; 296/1 S; 105/2 A; 280/150 C, 150 D, 150 E

[56] References Cited
UNITED STATES PATENTS
| | | | |
|---|---|---|---|
| 2,976,077 | 3/1961 | Totton | 296/1 S |
| 2,569,983 | 10/1951 | Faure | 105/2 A |
| 3,425,741 | 2/1969 | Korff | 296/1 S |

FOREIGN PATENTS OR APPLICATIONS
| | | | |
|---|---|---|---|
| 618,608 | 11/1959 | Italy | 296/1 S |

Primary Examiner—Philip Goodman
Assistant Examiner—John A. Carroll
Attorney—Gerald Singer

[57] ABSTRACT

The invention describes a pair of air foils having a positive dihedral angle with respect to each other. The air foils are inverted and generate a force in a downward direction that is normal to the lifting plane of the air foils. The downward force generates a vertical component which is added to the weight of the vehicle for improving traction and also generates a horizontal component. With the vehicle moving in the direction it is pointing the horizontal components generated by each air foil are equal and opposite and hence balance each other. During a turn in which the vehicle yaws, the inboard air foil generates more downward force and a greater horizontal force than the outboard air foil. The asymmetrically generated forces result in an increased vertical component and an increased horizontal component on that side of the car going into the turn thereby counteracting the centrifugal forces which increase stability of the vehicle in turn.

5 Claims, 8 Drawing Figures

PATENTED OCT 30 1973 3,768,582

STABILIZING DEVICE

This invention relates to a high speed racing vehicle and to a stabilizing device for attachment to a high speed vehicle and more particularly to a device for improving the stability of vehicles in a turn.

In the field of high speed vehicles and particularly racing cars there are certain inherent stability problems that result directly from the movement of the car through the air at high speeds.

The over-all shape of the moving vehicle is most important since the speeds vary, for example from 160 miles an hour in a turn to 240 miles on the straightways as at the Ontario Raceway. Since the Ontario Raceway is approximately a 2½ mile oval, the present day race cars are obtaining average speeds in excess of 190 miles per hour. In order to drive vehicles at these speeds, the shape of the vehicle must present a low coefficient of friction to the air flow in order to reduce the power requirements to propel the vehicle.

Consistent with a proper functional design with regard to air flow and reduced drag coefficients, it is also necessary that the vehicle be completely symmetrical to the air flow in order to minimize any lateral forces that may be generated as a result of unsymmetrical body effects. It is well known, for example, that air passing between the wheels and the body of the vehicle is accelerated due to the venturi effect caused by the wheel-body combination. This high speed flow of air over the body section generates lift since the body section of the vehicle acts an an air foil.

The lifting forces are generated over the body of the vehicle and contribute to a potential instability of the vehicle since the vehicle has a dynamic weight that is less than static weight due to the tendency of the vehicle to "fly". These lifting forces act throughout the complete surface of the vehicle and generally affect the vertical component or weight of the vehicle in a longitudinal path. Hence, depending upon the center of gravity of the vehicle and the differences in lift coefficient throughout the length of the vehicle, there is a tendency for the vehicle to become longitudinally unstable at high speeds.

In addition, lateral stability problems can exist if the vehicle is unsymmetrical about its own center line since a difference in body construction on either side of the center line will result in different horizontal forces being generated which can cause a lateral instability of the vehicle duing a straight run. Lateral instability problems are generally solved by very carefully constructing the surface of the vehicle so as to be symmetrical about its own center line.

In an effort to correct the flying tendency of the modern racing car, various techniques have been suggested and used in an effort to increase the weight of the car during high speed operation. For example, in the so-called McClaren racing car of 1971, a horizontal air foil was located about the rear wheels for generating a force in a downward direction so as to increase the vertical component on the rear wheels in an effort to increase traction during high speed operation. This concept is generally attributed to the inventor of the present invention in relation to single seater race cars and has been widely copied and utilized as a means of increasing vertical stability during high speed operation.

There are today many modifications of the McClaren type air foil and they include a horizontal air foil in the front of the car as well as in the rear of the car thereby to increase the vertical component at both the front and rear wheels. In addition other modifications include the use of four separate air foils located at each wheel to provide increased flexibility in obtaining an increased vertical component of weight at each of the four wheels.

A second most important problem associated with high speed vehicles is the instability of the racing vehicle when placed in a high speed turn.

It is well known that the centrifugal force, which is a function of the weight of the vehicle, the velocity of the vehicle and the instantaneous radius of the turn being attempted, tends to throw the vehicle in a direction that is away from the instantaneous center and in an outward direction. The forces resisting the centrifugal force is generally known and identified as the centripetal force which literally means seeking a center. In order for the vehicle to successfully navigate a turn with a minimum of drift, the two forces at any instant of time are kept substantially equal to each other.

In a properly banked raceway, the angle of the bank will generate a centripetal force into the center of the turn that is equal and opposite to the centrifugal force tending to push the car away from the center of the turn and for a single given speed and weight of race car the two forces will be equal and opposite and the vehicle will navigate the turn without any movement of the front wheels by the driver and with zero lift.

Unfortunately, modern roads as well as modern raceways are banked only for a so-called average turn which for the practical embodiment does not exist either for the highway driver or for the racing driver. Unbalanced lateral forces will therefore be generated for every turn whether the driver is going faster or slower than the bank of the road for that speed and weight condition.

The symmetrical characteristics of the vehicle while very desirable for straight high speed operation is not capable of coping with the unbalanced conditions present in a turn and hence can perform no useful function to provide stability during the turning of the vehicle.

This invention not only increases the stability of the vehicle during a straight run but also generates asymmetrical forces in a turn. These asymmetrical forces include an increased weight component on that side of the car that is turning into the turn. In addition there is generated increased asymmetrical centripetal forces into the center of the instantaneous radius of the turn thereby tending to decrease the drift or slip of the vehicle during the turn.

In this invention a pair of symmetrical air foils having a positive dihedral angle with respect to each other is attached to the vehicle so as to be symmetrical about the longitudinal axis of the vehicle. The air foils are arranged to generate a force in a downward direction that is generally normal to the lifting plane of the air foils. In the preferred embodiment a first pair of air foils is located rearward of the center of gravity of the car and a second pair of air foils is located at the front portion of the car to thereby provide additional stability in both a longitudinal and a lateral direction. Each pair of air foils are located symmetrically about the longitudinal axis of the vehicle so as not to affect the lateral stability of the vehicle during straight runs.

The forces generated by the lifting surfaces will be generally normal to the air foils and directed in a downward direction. The vertical components will tend to increase the weight of the vehicle whereas the horizontal components from each air foil will be in an outward direction that will be equal and opposite to each other. The vertical components will be additive and hence increase the weight of the vehicle whereas the horizontal components will be subtractive and cancel each other during straight and level operation.

During the turning operation, however, the air foil going into the turn will have an increased angle of attack relative to the oncoming air stream due to the drift or yawing action of the vehicle while executing the turn.

The inboard air foil will therefore generate an increased lifting force that results in an increased vertical component which increases the weight of the car on the inboard turning side. In addition, the horizontal component is increased thereby providing a larger centripetal force which acts in a direction into the turn.

The outboard air foil is subjected to a much smaller angle of attack and also is blanked by the action of the vehicle in making the turn and hence the normal forces generated by the outboard air foil is substantially reduced. The outboard air foil as a result generates practically no horizontal force or vertical force.

The asymmetrical forces generated by the pair of symmetrical air foils provides an increased weight component during straight and level operation and also asymmetrical forces during the turning operation that increases the weight on that side of the vehicle going into the turn while at the same time increases the centripetal forces in the direction of the turn thereby counteracting the centrifugal forces and increasing the stability of the vehicle in the turn.

Further objects and advantages of the present invention will be made more apparent by referring now to the accompanying drawings wherein.

Figure 3:
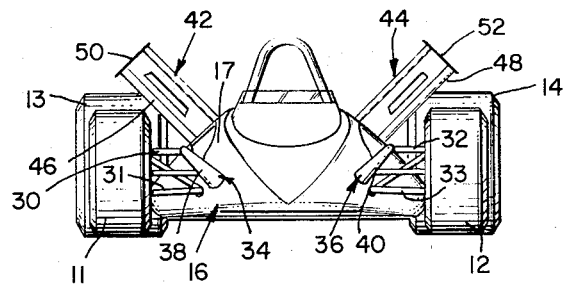
FIG. 3 is a front view of the racing car illustrated in FIG. 1.
Figure 2:
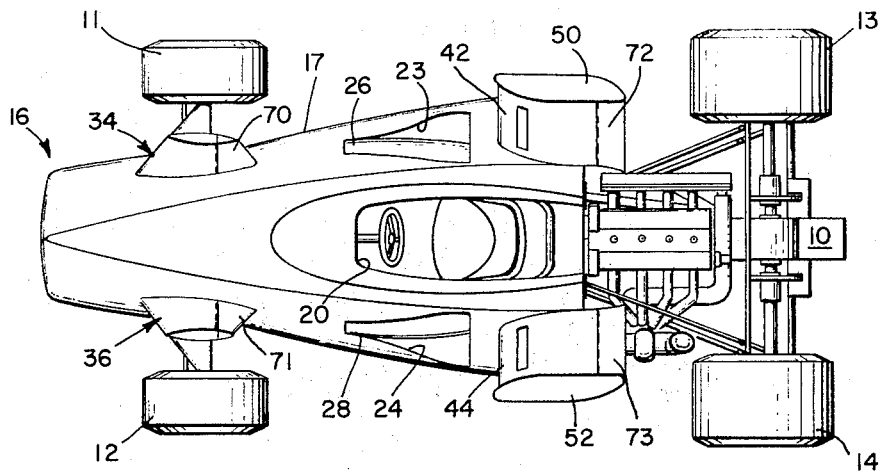
FIG. 2 is a plan view of the racing car illustrated in FIG. 1.
Figure 1:
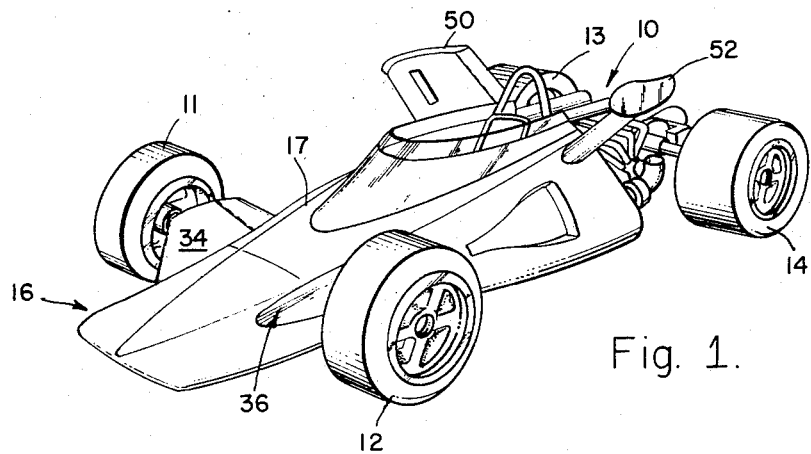
FIG. 1 illustrates a racing car hhaving a stabilizing device according to the teachings of the present invention.

Referring now to FIGS. 1, 2 and 3 there is shown a preferred embodiment of a racing vehicle 10. The invention is described in connection with a racing vehicle because the advantages associated with the stabilizing device are more pronounced in the high speed environment of the racing art. However, the stabilizing device being described is highly adaptive for any high performance moving vehicle such as a conventional road vehicle or boat.

The invention also has applicability to track vehicles such as high speed trains where the symmetrical air foils are made movable so as to generate symmetrical forces or asymmetrical forces depending on local conditions to be counteracted so as to reduce the lateral loading on the wheels and tracks.

The preferred embodiment is described in connection with the racing vehicle since the improved stabilization of the vehicle during straight runs or in turns will be most apparent and since the requirement for stability is extreme and the need for generating an asymmetrical force in the direction of the turn is quite apparent.

The racing vehicle illustrated in FIGS. 1, 2 and 3 is of an advanced design and makes use of different techniques for minimizing the drag coefficient. The racing car 10 is designed to conform to a formula set forth by the racing association which determines maximum size, dimension, weight, breadth and engine capacity for so-called unlimited racing cars capable of racing in the Indianapolis Speedway and associated tracks. Hence the size of the front wheels 11 and 12, the height of the vehicle and size of the rear wheels 13 and 14 and the engine 15 together with the over-all width and over-all length of the car are determined by the formula.

The front wheels 11 and 12 present a substantial frontal area to the air flow through which the car 10 must move. The general shape of the body 16 is made to project in front of the wheels 11 and 12 and grow in cross section so that at a point between wheels 11 and 12, the cross section of the body 16 is substantially equal to the frontal area presented by one of the wheels 11 and 12. In other words, the total frontal area at the axle of the front wheel consists one-third of wheel 11, one-third of body 16 and one-third of wheel 12. The wheels 11 and 12 unfortunately are not aerodynamically clean and present a sizeable obstruction to the moving air stream which normally would tend to go around and outside the wheels. However, in order to obtain maximum stability the front wheels 11 and 12 are placed at the maximum allowable space from each other which has the effect of interfering with the normal flow of air around the wheels.

Due to the wide placement of the front wheels 11 and 12 the moving air stream is forced to move between the wheels and the body 16. This increased velocity of air is also enhanced by the venturi effect between the inside of the wheels 11 and 12 and the surface of the body 16. The energy necessary to move the air is naturally supplied by the engine 15 and since the moving air represents a substantial investment of energy, it is most desirable to maintain the velocity of the moving air at a substantially constant velocity gradient so as not to lose any of the energy already invested in the moving air stream. This is another way of defining a clean aerodynamic body having a low drag coefficient.

The aerodynamic principle of Area Rule indicates that the area of the body 16 in contact with the moving air should be kept substantially constant so as not to change the air velocity and hence lose the energy in the moving air. Since energy is equivalent to power generated by the engine 15, the general shape of the body 16 gradually increases in diameter as at 17 in the space beyond the position of the wheels 11 and 12. The increasing area of the body at 17 will approach the combined frontal area of wheels 11, 12 and body 16 so as to maintain the same frontal area to the moving air stream at all points along the body of the car 10. In this manner once the moving air stream has been accelerated, the equivalent body area is maintained to the air stream and the energy in the air stream is maintained at a substantially constant value.

Centrally located in the body 16 is the driver compartment 20 which is located on the longitudinal axis of the vehicle and contain the necessary equipment for controlling, stopping and moving the vehicle.

Cooling ducts 23 and 24 are symmetrically located on the body 16 on each side of the driving compartment 20. Each duct 23 and 24 has a vortex generator 26 and 28 which has the effect of generating a vortex of air that completely fills the opening defined by the ducts. It was found that under normal high speed conditions without the vortex generators 26 and 28, that the moving air would pass right over the ducts 23 and 24 and would not fill the openings and hence, would not pass over the cooling accessories located within the duct which are necessary for proper operation of the engine 15. The vortex generators 26 and 28 create a localized condition for filling the duct opening and do not otherwise disrupt the air flow.

The smoothly moving air continues to pass over the body section 16 at a substantially constant velocity until the air stream hits the frontal area represented by the rear wheels 13 and 14 which have the effect of creating a general turbulence and disruption of the air flow so that the moving air passes both over and outboard of the rear wheels and also between the rear wheels. The rear wheels 13 and 14 generate lift by air passing over the wheels in a similar manner as described in connection with the front wheels 11 and 12. The air foil effect of the wheel and the body itself all contribute to a potential lateral and longitudinal instability.

As FIGS. 2 and 3 illustrate the front wheels 11 and 12 are aligned with the rear wheels 13 and 14 respectively. The cross sectional shape of the body 16 is varied according to the area body rule as mentioned previously in order to keep the velocity gradient of the air substantially constant. This means that the air flowing between the front wheels 11 and 12 and the body 16 is moving at a substantially high velocity in the low pressure area caused by the venturi effect existing between the wheels and the surface of the body 16. The upper and lower wheel supports 30 and 31 for wheel 11 and upper and lower supports 32 and 33 respectively for front wheel 12 are located directly in the air stream and would normally contribute heavily to the drag coefficient of the vehicle.

Located on the body 16 between the front wheels 11 and 12 are a pair of air foils 34 and 36 which form an integral part of the chassis construction and house the upper front wheels supports 30 and 32 for each front wheel 11 and 12 respectively. The air foils 34 and 36 are load bearing members located at a 45° angle with respect to the horizontal plane. Described in another way it can be said that the air foils 34 and 36 form a positive 90° dihedral angle with respect to each other. In order to achieve lateral stability the front air foils 34 and 36 are symmetrical with respect to the longitudinal axis of the vehicle 10 so as to generate symmetrical forces about the longitudinal axis.

The front air foils 34 and 36 have a contoured surface for generating lift and are similar to the standard air foils presently used on aircraft for defining a lifting surface. The front air foils 34 and 36 however are located so as to generate a force in the downward direction as opposed to the conventional technique of having the air foil generate lift in an upward direction. This means that the lowermost portion 38 of air foil 34 and the lowermost portion 40 of air foil 36 represent the high lift generating surface of the air foil.

The effect of having the high lifting surfaces 38 and 40 on the lowermost portion of the air foils 34 and 36 means that during normal operation of the vehicle the air foils will each generate a downward vertical component and an outward lateral or horizontal component. These forces result from the normal effect of an air foil which is to generate a force in the direction that is normal to the lifting plane of the air foil. Considering air foil 34, for example, it can be shown that a force normal to the lifting surface 38 will be generated and that this force will result in a vertical downward force and a horizontal or lateral outward force. In a similar fashion air foil 36 will generate a downard vertical force and a horizontal or lateral force that is equal and opposite to the lateral force generated by air foil 34. These forces are more fully described in connection with FIG. 5a.

When considering a straight run condition, it can be shown that air foils 34 and 36 will each contribute a component in the downward direction that represents an added weight or downward force tending to keep the front of the vehicle closer to the ground so as to increase the traction between the front wheels 11 and 12 and the ground. This downward force tends to counteract the tendency of the body 16 to generate ligting forces as previously described. The lateral forces generated by air foils 34 and 36 are equal and opposite during normal high speed straight runs and hence will cancel and have no effect on the stability of the vehicle.

A review of the placement of air foils 34 and 36 will show locations on the body 16 at a place where the air flow over the body is constant and clean and hence, is aerodynamically highly efficient. It can be appreciated that placing the air foils before the wheels or in the area of the wheel turbulence will otherwise interfere with the velocity gradient of the moving air thereby increase the drag coefficient of the vehicle and also reduce the efficiency of the air foils themselves. It will be appreciated by those skilled in the art that any change in body construction attempting to increase the stability of the vehicle must be achieved without increasing drag or otherwise interfere with the flow pattern of the air passing over the vehicle since a brute force approach that results in increased drag must be paid for by higher horsepower which results in a greater gas consumption and low reliability of the engine and driving parts. Improvements to a vehicle are always considered in terms of safety and reliability which items can never be compromised either on a race track or otherwise.

Figure 5A:
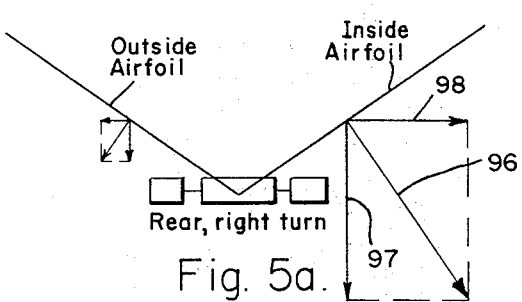
FIG. 5a is a schematic drawing illustrating the forces generated by the stabilizing device in a right hand turn as viewed from the rear.

Located on each side of the driver and substantially between the driver compartment 20 and the rear wheels 13 and 14 is a second pair of symmetrical air foils 42 and 44 that are similar to air foils 34 and 36 but are extremely thicker and larger so as to generate more lifting force. The air foils 42 and 44 also having a positive dihedral of 90° which means that each air foil has a 45° angle with respect to the horizontal plane. The air foils 42 and 44 are similarly symmetrical with respect to the longitudinal axis of the vehicle so as not to unbalance the lateral or longitudinal stability of the vehicle during normal high speed operation. The air foils 42 and 44 are constructed so as to generate a force in the downward direction as previously described in connection with front air foils 34 and 36. For example, the lifting surface 46 of air foil 42 and lifting surface 48 of air foil 44 are on the lowermost portion of the air foils so as to generate a downward force that is generally normal to the lifting surface 46 for air foil 42 and similarly a downward force that is normal for lifting surface 48 of air foil 44 as illustrated in FIG. 5a.

The actual size of the air foils 42 and 44 are a function of the over-all design of the vehicle 10. For example, in the preferred embodiment the rear wheels 13 and 14 are designed to carry approximately two times the load that is carried by the front wheels 11 and 12. The weight distribution selected for any given design is a function of many factors which include the engine size and weight, the terminal speed expected, the desired acceleration and deceleration available from the brakes being used and many other empirical factors that are a result of trial and error. Having a greater weight distribution in the rear of the vehicle requires that the lifting forces generated by the rear air foils 42 and 44 be made substantially larger than the front air foils 34 and 36 in an attempt to generate substantially twice the lifting forces in proportion to the weight distribution.

End plates 50 and 52 are located on each end of air foils 42 and 44 in an effort to control the air flow over the air foils and prevent air separation from the surfaces in a manner well known in the wing design art.

As described in connection with the front air foils 34 and 36, the rear air foils 42 and 44 each generate vertical component in a downward direction and lateral horizontal components in the outward direction. This means that the vertical components of the forces generated by the lifting surface 46 will be added to the vertical component generated by the lifting surface 48. The lateral or horizontal component of the force generated by lifting surface 46 will be in the outward direction and opposite to the horizontal or lateral force generated by the lifting surface 48. It can be appreciated therefore that the effect of the air foils 42 and 44 in a straight high speed operation will generate a downward force on the rear wheels tending to offset the tendency of the rear wheels from lifting or flying.

In the preferred embodiment each of the air foils is made separately movable so as to adjust or otherwise trim the car for any condition of weight or unbalance. Individual tab sections 70, 71, 72 and 73 are located on the trailing edges of each of the air foils 34, 36, 42 and 43 respectively to obtain the necessary trim conditions required to generate stability at straight high speed operations. Depending on external conditions such as special rules concerning the construction of racing cars the individual trims may be manually adjusted by the mechanics, automatically moved or movably adjusted by the driver during operation of the vehicle.

While the description of the front air foils 34 and 36 and the rear air foils 42 and 44 have been described in connection with high speed straight operations, the unobvious contribution made by these air foils will be made more readily appreciated by reviewing the effect these air foils have when the car is in a turning condition.

Figure 4A:
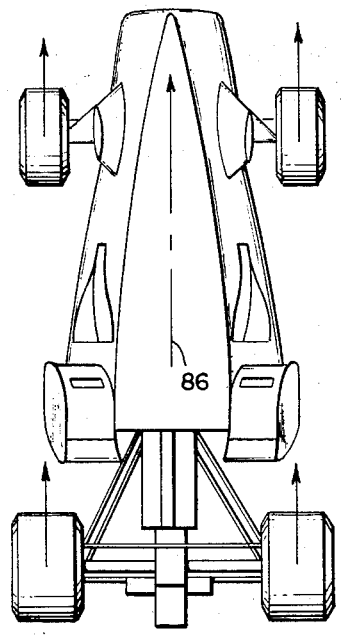
FIG. 4a is a schematic diagram illustrating forces generated with the front wheels aligned with the rear wheels.

Referring now to FIG. 4a there is shown a schematic plan view illustrating the forces generated on the front and rear wheels while a car is moving in a straight direction. As will be observed the forces generated by the front wheels and the rear wheels are in the same direction that the vehicle is moving which is what one would expect.

Figure 4B:
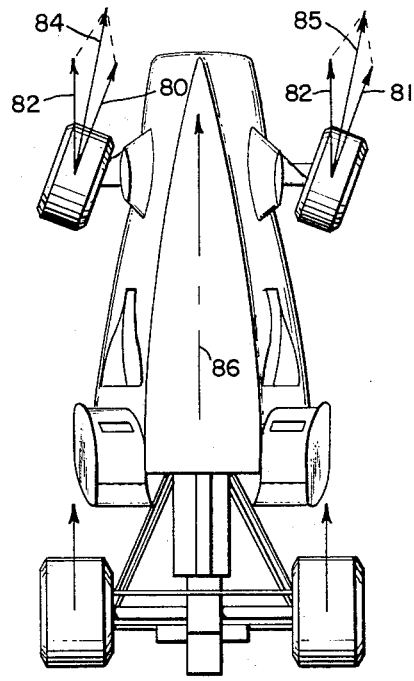
FIG. 4b is a schematic diagram illustrating the forces generated when the front wheels are initially turned and before the vehicle has begun any turning movement.

Referring now to FIG. 4b there is shown a condition immediately following that illustrated in FIG. 1a where the front wheels are initially turned so as to cause the car to corner. When the front wheels are turned as shown, the tread of the two front tires in contact with the ground deform to generate a force in the direction the wheels are actually pointing as at 80 and 81. The initial force of the car, however, is in the original direction as shown by vector 82 and 83 with the result that vectors 80 and 82 for the left wheel combine to form a resultant vector 84 while vectors 81 and 83 for the right wheel combine to form a resultant vector 85. Resultant vectors 84 and 85 represent the actual direction that the front wheels will travel and is the reason that the car travels in a different direction to which the wheels are pointing which explains why a car in a turn drifts and appears to run wide.

A review of the vector diagrams for both front wheels will show that the centripetal force causing the front end to initially turn into the turn is caused by the deformation of the tread on the front wheel tires and can be measured as the lateral or horizontal component of vectors 80 and 81.

It should be noted, however, that the car is still pointed in the original direction as shown by vector 86 which passes through the longitudinal axis and through the center of gravity of the car. The important observation to make is that the car is pointed in the direction of vector 86 but is actually starting to move in the direction of vectors 84 and 85. The car appears as to be slipping while actually the tread is deforming to define the slip angle which is the difference between the direction the car is pointing and the direction it is actually moving. It is this phenomena that prevents the car from turning about a fixed radius perpendicular to the longitudinal axis of the vehicle. The car actually drifts about a turn which can be expressed mathematically as rotating about a different instantaneous center as the car drifts about the turn.

Figure 4C:
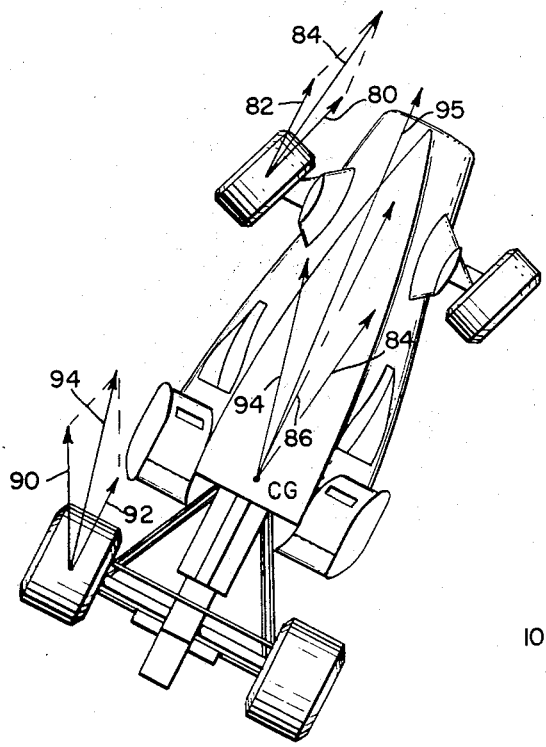
FIG. 4c is a schematic diagram illustrating the forces generated when the front wheels are turned and the rear wheels attempt to track in the turn.

Referring now to FIG. 4c there is shown the next step in the turn which illustrates how the rear wheels are deflected from their original direction as shown by vector 90 due to the longitudinal axis of the car as shown by vector 86 being forced to move in the direction of vector 84 as indicated in the front left wheel. Since the rear wheels are fixed, vector 92 is represented as being parallel to vector 86 which is the direction the vehicle is pointing and hence the summation of vectors 90 and 92 show a resultant force generated by the rear wheels in a direction as indicated by vector 94. The vector diagram for the right rear wheel is substantially similar to that illustrated for the left wheel. The centripetal force generated by the rear wheel is actually the result of the tread of the rear wheel being deformed to produce the resultant vector 94. The centripetal force can be measured and is a function of the horizontal component of the vector 92. It is the centripetal force generated by the rear wheels that prevents the rear of the car from breaking loose and spinning out.

The instantaneous direction of the vehicle is actually the vector summation of resultant vector 84 from the front wheel and the resultant vector 94 from the rear wheel which combine with the resultant forces generated on the front right wheel and the resultant forces generated on the left front wheel. The actual instantaneous direction at any given point of time is actually very complicated and almost impossible to predict. However the simplified drawings of FIGS. 4a, 4b and 4c will show that the actual movement of the car through a turn is shown by vector 95 which is the vector sum of vectors 84 and 94 and is different from the direction that the car 86 is pointing for every instantaneous position of the vehicle during the turn. This phenomena has also been called the yawing action of the vehicle or drifing action as the car enters and passes around a given turn.

The defined yawing action described in connection with FIG. 4 result in the air foils on the inside of the turn having a greater angle of attack to the relative wind because of the positive dihedral angle. By referring to FIG. 5a, there is illustrated a vector diagram showing how the increased angle of attack increases the force in the downward direction as shown by vector 96 which is normal to the lifting surface of the defined air foil. The increased vertical component 97 increases the weight on that side of the car going into the turn while at the same time the horizontal or lateral component 98 which indicates an increased centripetal force into the turn is also increased. The outside air foil is presented with a minimum angle of attack and depending on the wash out of the air foils and the degree of yaw can be made to have a negative angle of attack. As a result of the negative angle of attack on the outside air foils produce an extremely small normal force if at all.

Figure 5B:
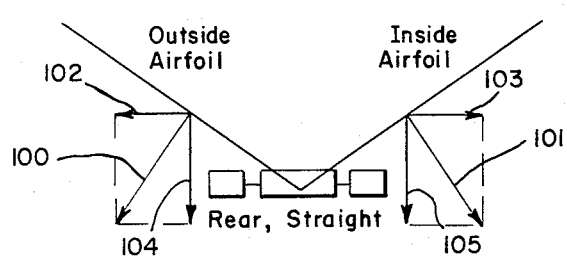
FIG. 5b is a schematic drawing illustrating the forces generated by the stabilizing device with the vehicle in a straight run.

A review of the action of the air foils will show, therefore, that the yawing action of the vehicle in the turn generates an asymmetrical loading on the vehicle in the turn which results in increased weight on the inside of the turn and increased centripetal forces on the inside of the turn. The increased weight as shown by vector 97 in FIG. 5b tends to counteract the tendency of the inside wheels to lift and transfer load to the outside wheels. In addition the asymmetrical centripetal force indicated by the vector 98 tends to counteract the centrifugal forces tending to force the vehicle in an ever-widening drifting turn. The same principle is evident whether the vehicle turns to the left or to the right since the air foils are substantially identical and are located symmetrical about the longitudinal axis of the vehicle.

A review of FIG. 5a will show that when the vehicle is running straight and level that both air foils generate equal normal forces as shown by vectors 100 and 101 that are perpendicular to the lifting surface of the air foil. Since both forces are equal the horizontal or lateral force vector 102 and 103 will be equal and opposite and hence the lateral forces will cancel each other and have no effect on the vehicle during a straight high speed run. It will be noted, however, that the downward component vectors 104 and 105 are substantially equal to each other and are in the same direction thereby tending to keep the car on the ground and reducing the tendency of the vehicle to fly.

For a vehicle having fixed air foils it will be appreciated that the asymmetrical forces generated in the turn will be a function of the degree of yaw experienced by the vehicle. In other words, should the driver make a sharp turn and have a high yaw angle then the resultant forces will be increased automatically whereas should the driver make a shallow turn and have a low yaw angle, then correspondingly the asymmetrical forces generated by the air foils will be less.

While the present invention has been described in connection with high speed land vehicles or high speed boat vehicles, it is quite apparent that other uses of the air foils will present themselves. It is quite apparent that the stabilizing device has greatest utility for those high speed vehicles that have the ability to generate a yawing action between the direction the vehicle is pointing and the direction the vehicle is actually moving.

However, there are uses for the dihedral air foils on high speed trains where the individual air foils are movable from within the train so as to counteract asymmetrical outside loading forces such as wind gusts or other external conditions, since making the air foils movable allow the operator to generate asymmetrical forces that can be made equal and opposite and hence counteract the effect of outside forces.

It will be appreciated that movement of the air foils could either be accomplished by making the complete air foils movable or to simply use controllable movable trim tabs.

I claim:

1. A racing car having outboard front wheels and rear wheels comprising a streamlined body constructed according to the area body rule,
   a first pair of symmetrical air foils having a positive dihedral angle with respect to each other for generating a force in a downward direction normal to the lifting plane of said air foils,
   said first pair of air foils being located on said body substantially abeam said front wheels,
   the size of said first air foils being determined as a function of the weight distribution on said front wheels, and
   a second pair of symmetrical air foils having a positive dihedral angle with respect to each other for generating a force in a downward direction normal to the lifting plane of said air foils,
   said second pair of air foils being located on said body between said front wheels and said rear wheels in an area of substantially constant air flow,
   the size of said second air foils being determined as a function of the weight distribution on said rear wheels.

2. A racing car according to claim 1 in which the dihedral angle on said first and second pair of air foils are the same.

3. A racing car according to claim 1 in which the weight distribution of said rear wheel is twice the weight on said front wheel and in which the second pair of air foils are sized to generate twice the vertical down force as said first pair of air foils.

4. A racing car according to claim 1 in which the first pair of air foils substantially cover the wheel supports for the front wheels.

5. A racing car according to claim 1 in which each of said air foils are independently movable.

* * * * *